2 Sheets—Sheet 1.

G. B. SELDEN.

MACHINE FOR SHAVING HALF-ROUND HOOPS.

No. 7,799. Reissued July 17, 1877.

Witnesses:

M. H. Briggs

Y. G. Outerbridge

Inventor:

George B. Selden

N. PETERS, PHOTO-LITHOGRAPHER, WASHINGTON, D. C.

2 Sheets—Sheet 2.

G. B. SELDEN.

MACHINE FOR SHAVING HALF-ROUND HOOPS.

No. 7,799. Reissued July 17, 1877.

Witnesses:

W. H. Briggs

J. G. Outerbridge.

Inventor:

George B. Selden.

N. PETERS, PHOTO-LITHOGRAPHER, WASHINGTON, D. C.

UNITED STATES PATENT OFFICE.

GEORGE B. SELDEN, OF ROCHESTER, NEW YORK.

IMPROVEMENT IN MACHINES FOR SHAVING HALF-ROUND HOOPS.

Specification forming part of Letters Patent No. 171,247, dated December 21, 1875; Reissue No. 7,799, dated July 17, 1877; application filed January 2, 1877.

*To all whom it may concern:*

Be it known that I, GEORGE B. SELDEN, of the city of Rochester, in the State of New York, have invented an Improvement in Machines for Shaving Half-Round Hoops, of which the following is a specification:

My invention consists in combining a knot-cutter, or cutter-head for trimming the knots, which is controlled by rests, so shaped and arranged that the knots are trimmed above the general bark-line and the strength of the hoop is left unimpaired at the knots, with a shaving cutter-head, provided on the split side of the hoop with rests for supporting the hoop, and a yielding pressure-roller on the bark side, which yields back over the knots trimmed by the knot-cutter, and allows them to pass through between the roller and the head without thinning the hoops opposite the knots.

It also consists in controlling a movable cutter-head for shaving the flat side of the hoop by one or more elastic pressure-rollers on the bark side, which yield back over a knot, and allow it to pass through between it or them and the head without thinning the hoop opposite the knot, while at the same time they cause the head to conform to the curves of the stock.

My invention also consists in the combination, with the devices last mentioned, of a cutter-head for trimming the knots.

Figure 1:
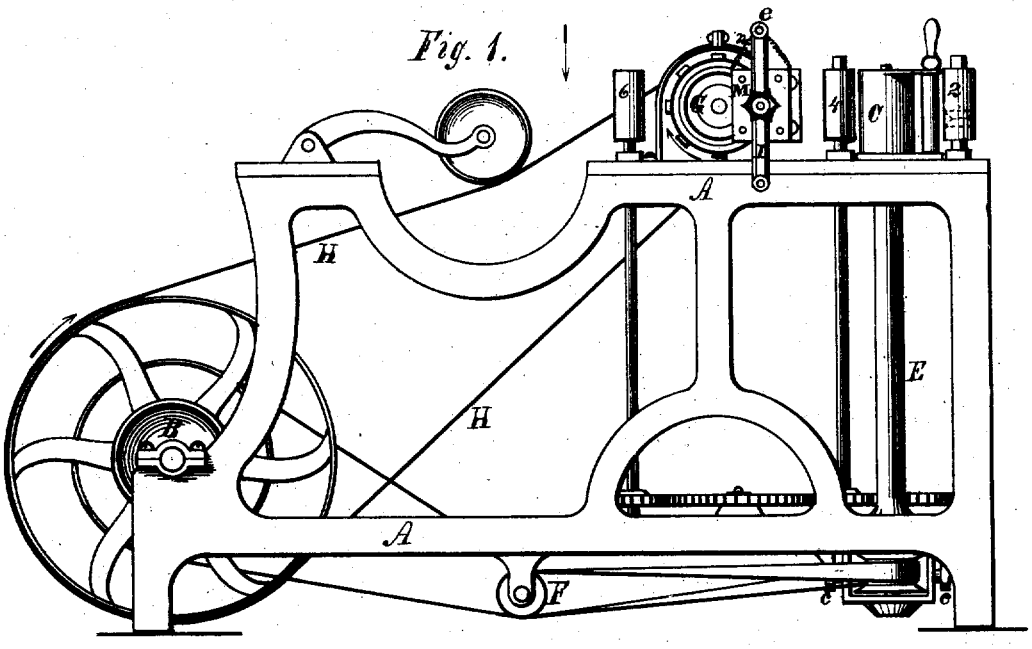
Figure 2:
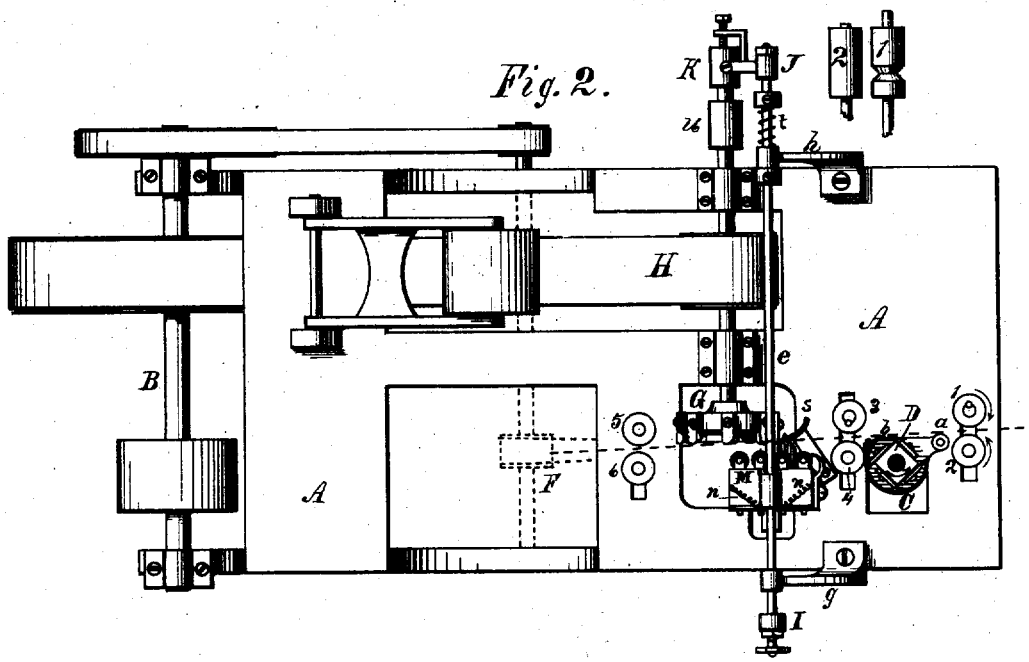
Figure 3:
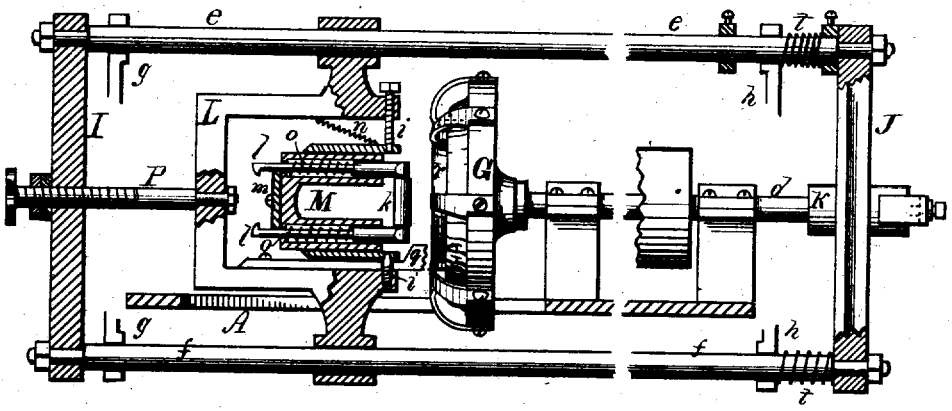
Figure 5:
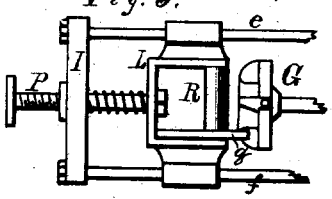
Figure 4:
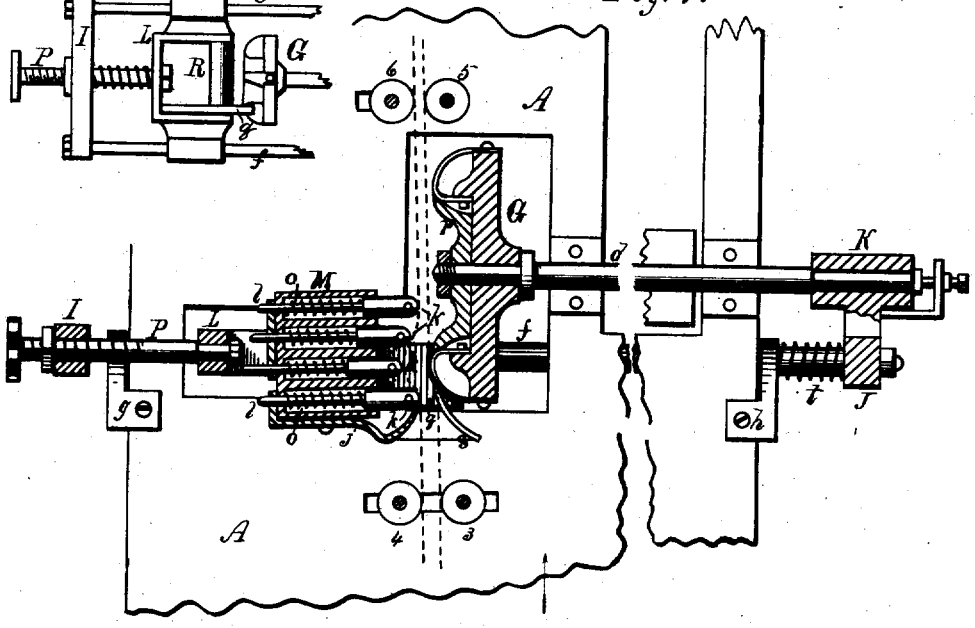

In the accompanying drawings, Figure 1 represents an elevation, and Fig. 2 a plan view, of a machine embodying my invention. Fig. 3 is an elevation, partly in section, of the main cutter-head and its connections. Fig. 4 is a plan view of the same, and Fig. 5 shows a single yielding roll arranged to pass the knots.

A A is the frame of the machine, and B the driving-shaft. The hoop is fed through the machine by the feed-rollers 1 2, 3 4, 5 6, its path being indicated by dotted lines in the drawings. The feed-rollers are carried by vertical shafts stepped in the bottom plate of the machine, and passing through the top plate, and are connected by a train of gears, which is driven, in any convenient manner, either from the shaft B or from the pulley *u*, Fig. 2, on the shaft of the shaving cutter-head. Of the feed-rollers, 1 and 5 revolve in stationary boxes, while rolls 3 and 4, although clamped together by a spring, are free to travel with the curves of the stock across the line of feed.

C, Figs. 1 and 2, is the knot-cutter, which consists of a movable cutter-head, D, Fig. 2, held against the bark side of the stock by a spring, and controlled in its operation on the knots by a yoke-frame, which swivels about the head, and has rests *a b*, Fig. 2, which bear on the stock before and after the head.

The frame E, Fig. 1, which supports the shaft of the cutter-head D, is swung on trunnions at *c c*, and the cutter-head is driven from the main driving-shaft B by the interposition of the counter-shaft F.

The knot-cutter differs from the knot-cutter described in the patent of J. Penney, November 1, 1870, in the shape of the rest *b* after the head, and in the adjustment of the rest *a* before the head, so as to prevent the knives of the head from trimming the knots too close.

The cutter-head G, for shaving the flat side of the hoop, is carried by a horizontal spindle, *d*, having end play through its boxes. This head is driven from the shaft B by the belt H, Fig. 1. A movable frame, consisting of rods *e f*, Fig. 3, sliding in suitable standards *g h*, and of end pieces I J, is boxed on the outer end of the shaft *d* at K, and partakes of the motions of the head.

A frame, L, Fig. 3, fitted to the rods *e f*, carries the knot-passer M. This consists of a U-shaped casting, (shown in section in Fig. 3,) pivoted in the jaws of the frame L at *i i*, and affording support for the sliding pieces *l l*, which carry the yielding pressure-rollers *k k k*, Fig. 4. The two wings of the U-shaped casting or knot-passer frame are bored with a series of holes, to receive the sliding pieces *l l* and the spiral springs which surround them, and each roller *k* is supported by its corresponding slides, at top and bottom, on a pin, which passes from one slide to the other.

A plate, *m*, Fig. 3, on the back end of the knot-passer frame, prevents the slides *l l* from being pushed out of their holes by the springs *o o*, and a suitable flange-guide, *j*, Fig. 4, attached to the outer end of the first pair of slides, facilitates the entrance of the hoop between the knot-passer and the head G. Each of the rollers *k k k* yields back on its own springs independently of the others. The pivotal points *i i* of the knot-passer frame should be as near the knives as possible, and the swinging motion of the knot-passer on its pivots *i i* must be limited by suitable stops, so as to prevent the rollers *k k k* from coming in contact with the knives. The equalizing-springs *n n*, Fig. 2, serve to hold the knot-passer in proper position when doing no work.

The sustaining-frame L and the knot-passer may be moved to and from the head to gage the thickness of the hoop, by means of the screw-rod *p*, Figs. 3 and 4. A rest, *q*, Figs. 3 and 4, attached to the frame L or to the lower rod *f* and to the frame L, passes under the knot-passer, and by its inner end, which is shaped to conform to the knives, supports the hoop during the shaving process.

Inside of the cutter-head G is placed a narrow ring, *r*, Figs. 3 and 4, flush with and as near as possible to the finishing-point of the knives. The cutter-head G and the movable frame, with its connections, are all drawn backward by the springs *t t* on the rods *e f*. A stationary vertical rest, *s*, Fig. 4, secured to the frame of the machine in front of and close to the head G, supports the hoop against the pull of the springs *t t*. The head, when not at work, is slightly back of the rest *s*, and, as the hoop enters between the head and the knot-passer, the head is drawn forward to get at its work. The springs *o o* in the knot-passer are, collectively, stronger than the springs *t t*, which draw the head away from the stock, and a curve in the hoop, acting against all the rollers of the knot-passer, will draw the head forward and cause it to conform to the curve, while a knot acting against a portion only of the rollers at once, will pass through by forcing the rollers *k k k* back one after the other, (see Fig. 4,) without pulling the head into the stock, any sudden tendency in the head to gouge into the wood being resisted by the internal ring *r*, which has a continuous bearing on the shaved surface of the hoop; and at the same time that this operation is going on the head may be coming forward or falling back, in conformity to the general outline of the stock.

I have used the knot-passer with only four rollers in it, but prefer six, and generally make them five-eighths or three-fourths of an inch in diameter, and place them as close together as possible.

For shaving angular splints—that is, splints obtained by splitting poles into three or more parts—I use a grooved feed-roll in place of rolls 1 and 3. These rolls are feathered on their shafts, to enable them to rise and fall with the vertical curves of the stock, and their use is to so present the stock to the cutter-head G that it may be shaved on the proper line.

On heavy stock the knot-passer may consist of a single yielding roll, R, Fig. 5, arranged to yield back, in passing the knots, on a spring on the rod *p*.

I have used the head G stationary, the rest *s* being arranged to yield back on a spring, but I prefer to build the machines with a movable head, as shown.

I claim—

1. The movable cutter-head G, controlled by the yielding knot-passer M on the bark side of the hoop, and the supporting-rest *q*, traveling with the head G, in combination with the stationary rest *s*, substantially as described.

2. The movable cutter-head G, when provided with the ring *r*, in combination with the yielding knot-passer M on the bark side, operating substantially as described.

3. The knot-cutter C, in combination with the movable cutter-head G, provided with the internal ring *r*, and the knot-passer M on the bark side, operating substantially as and for the purposes set forth.

4. The movable cutter-head G, provided with the internal ring *r*, and knot-passer M on the bark side, in combination with the angular feed-roll 2 or 3, either or both, operating substantially as described, for the purposes set forth.

5. In combination with the movable cutter-head G, controlled by the yielding knot-passer M on the bark side, the supporting-rest *q*, traveling with the head.

6. The combination of the cutter head G, controlled from the bark side by the knot-passer M, with the rest *s*.

7. In combination with the movable cutter-head G, provided with the ring *r*, the pivoted knot-passer frame M, containing a series of rollers, *k k k*, operating to control the head and pass the knots, substantially as described.

8. The movable cutter-head G, when provided with the internal ring *r*, in combination with the yielding roll R on the bark side of the hoop, operating substantially as described.

9. The combination, in a hoop-dressing machine, of the knot-cutter C, and the shaving-head G, provided with supporting-rests on the split side of the hoop, and a yielding roll or rollers opposite the shaving-head, operating substantially as and for the purposes set forth.

10. The combination, in a hoop-dressing machine, of the knot-cutter C, the shaving-head G, provided with supporting-rests on the split side of the hoop, and a yielding roll or rollers opposite the shaving-head, and the angular grooved feed-rollers 1 or 3, either or both, operating substantially as and for the purposes set forth.

GEORGE B. SELDEN.

Witnesses:

T. G. OUTERBRIDGE,

F. A. MACOMBER.